Aug. 12, 1930.                    W. H. WOOLUMS                        1,773,071
                        ANTIGLARE DEVICE FOR VEHICLE HEADLIGHTS
                                   Filed Nov. 17, 1928
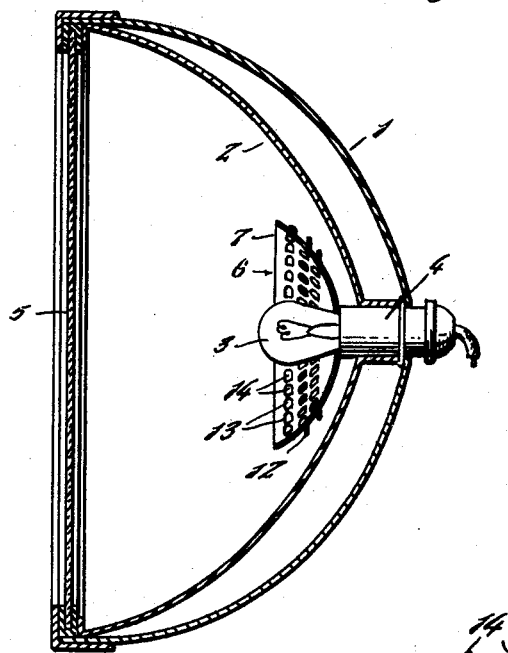
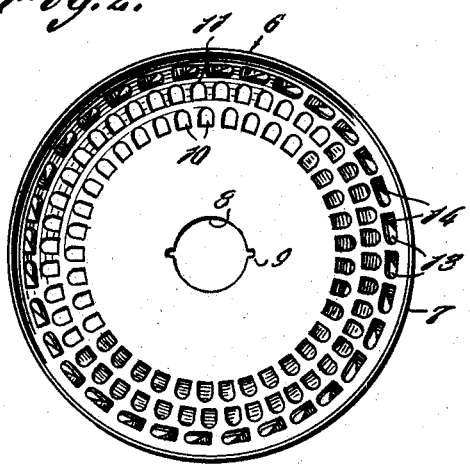
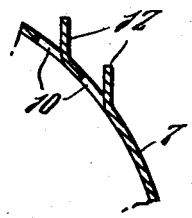
Inventor
William H. Woolums
By Clarence A. O'Brien
                Attorney Patented Aug. 12, 1930

1,773,071

UNITED STATES PATENT OFFICE

WILLIAM H. WOOLUMS, OF WASHINGTON, DISTRICT OF COLUMBIA

ANTIGLARE DEVICE FOR VEHICLE HEADLIGHTS

Application filed November 17, 1928. Serial No. 320,104.

The present invention relates to improvements in glare preventers for automobile headlights and has for its principal object to provide a device which may be readily applied to headlights now in use, and which will permit the light to properly illuminate the road without producing any glare and at the same time preventing the loss or dissipation of the light.

Another important object of the invention is to provide an anti-glare device that comprises an auxiliary reflector for disposition in the rear of the headlight bulb, said reflector being provided with means for permitting the light rays to be projected or reflected onto the back portion of the main reflector at such an angle of incidence as to prevent concentration of the rays, so as to prevent glare, without at the same time detracting from the illuminating efforts of the headlights, that is to say, the efficiency of the headlights with regard to illumination will not be impaired with an attachment of this nature incorporated therewith, but at the same time the glare will be appreciably eliminated.

Still a further object is to provide an antiglare device that is simple in construction, inexpensive, strong and durable and further well adapted to the purpose for which it is designed.

Other objects and advantages of the invention will become apparent during the course of the following description when taken in connection with the accompanying drawing.

In the accompanying drawing wherein like reference characters indicate corresponding parts throughout the several views:

Figure 1 is a vertical sectional view of a vehicle headlight and the anti-glare device embodying my invention associated therewith.

Figure 2 is a front elevation of the antiglare device per se.

Figure 3 is a detail sectional view through a portion of the auxiliary reflector constituting my improved anti-glare device, and Figure 4 is a similar section through another part of the auxiliary reflector.

In the drawing wherein for the purpose of illustration is shown the preferred embodiment of my invention, the numeral 1 designates generally an automobile headlight of the conventional construction that is provided with the usual parabolic reflector 2 and an electric lamp or bulb 3 that is detachably secured within a suitable socket 4 in the usual manner. The lens that is mounted in the open front side of the headlight casing is indicated at 5.

My improved anti-glare device is shown generally at 6, and the same comprises a substantially semi-circular shaped body 7 that is in the form of a shell and which may be of any suitable material, preferably aluminum. The concaved face of the shell constitutes an auxiliary reflecting surface.

The base of the auxiliary reflector is formed with a circular opening 8 to accommodate the lamp 3, and upon referring to Figure 2 it will be noted that a pair of diametrically opposed notches 9 communicate with the circular openings 8 to accommodate the laterally projecting pins that are formed on the stem or base of the lamp.

When the auxiliary reflector is positioned within the headlight casing, the same will be disposed rearwardly of the lamp 3 and in slight spaced relation with respect to the adjacent portion of the parabolic reflector 2.

Upon again referring to Figure 2, it will be observed that the shell 7 is formed with the inner and outer annular spaced rows of radially disposed slots 10 and 11, respectively, that are formed by striking out the tongues 12 in the manner as shown in Figure 4, and these tongues 12 provide a means for directing the rays of light at an angle of incidence against the parabolic reflector 2.

The shell 7 is formed with an additional circumferentially extending row of spaced slots 13 that extend around the shell outwardly of the row 11, and the tongues 14 are disposed circumferentially in an outward direction, whereas the tongues 12 are disposed radially.

All of said tongues aid in properly directing the rays of light against the parabolic reflector 2 so that the light rays are distributed avoiding a concentration of light upon any one certain area of the reflector 2, and thus cooperating with the reflector to produce an effective distribution of light rays. The rays of light are reflected forwardly from the area between the auxiliary reflector 6 and the main parabolic reflector 2.

While I have shown three annular rows of slots and struck out tongues as being formed in the shell, it is to be understood that I do not wish to limit myself to the particular number of rows of slots that may be provided.

The simplicity of my device enables the same to be readily and easily attached in position in a headlight casing without necessitating any alterations of the headlight and furthermore the anti-glare device will at all times be positive and efficient in carrying out the purposes for which it is designed.

While I have shown the preferred embodiment of my invention it is to be understood that minor changes in the size, shape and arrangement of parts may be resorted to without departing from the spirit of the invention or the scope of the appended claims.

Having thus described the invention, what I claim as new and desire to secure by Letters Patent is:—

1. In an anti-glare attachment for headlights, a concavo-convex light reflecting shell formed of polished metal, and having an opening formed therein to accommodate the bulb of the headlights, said light reflecting shell being formed with a plurality of spaced annular rows of light emitting openings, the material of the shell at each opening of the respective series being struck out to provide tongues extending over and above the respective openings, the tongues of certain of said rows extending circumferentially with respect to the shell, and the tongues in the other of said rows extending radially with respect to said shell.

2. An anti-glare attachment for headlights comprising a light reflecting shell formed of polished metal and having a central opening to accommodate the headlight bulb, said shell being provided with a pair of inner and outer spaced annular rows of struck out tongues that provide light ray emitting passages, the tongues of said rows being disposed circumferentially, a third annular row of struck out tongues formed on said shell adjacent the peripheral edge of said shell, and the tongues of the last mentioned row being disposed radially.

In testimony whereof I affix my signature.

WILLIAM H. WOOLUMS.